Feb. 18, 1930.  R. C. PAULY  1,747,879
PRESSING MACHINE
Filed Nov. 11, 1926    5 Sheets-Sheet 3
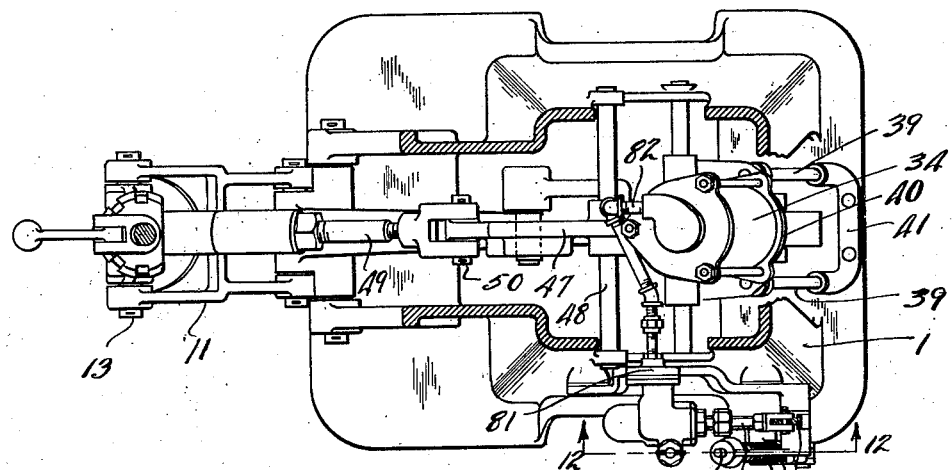
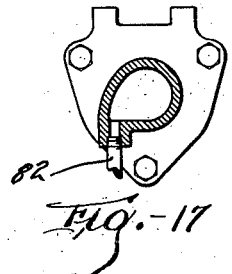
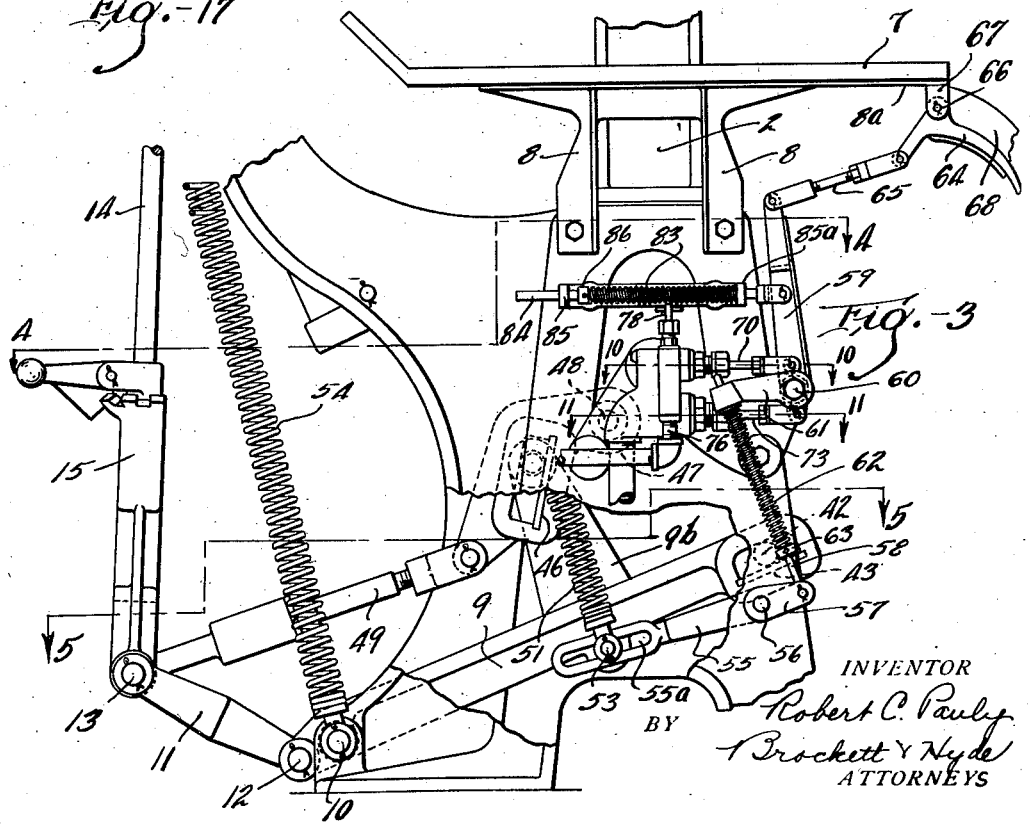
INVENTOR
Robert C. Pauly
BY
Brockett & Hyde
ATTORNEYS Feb. 18, 1930.  R. C. PAULY  1,747,879
PRESSING MACHINE
Filed Nov. 11, 1926   5 Sheets-Sheet 4
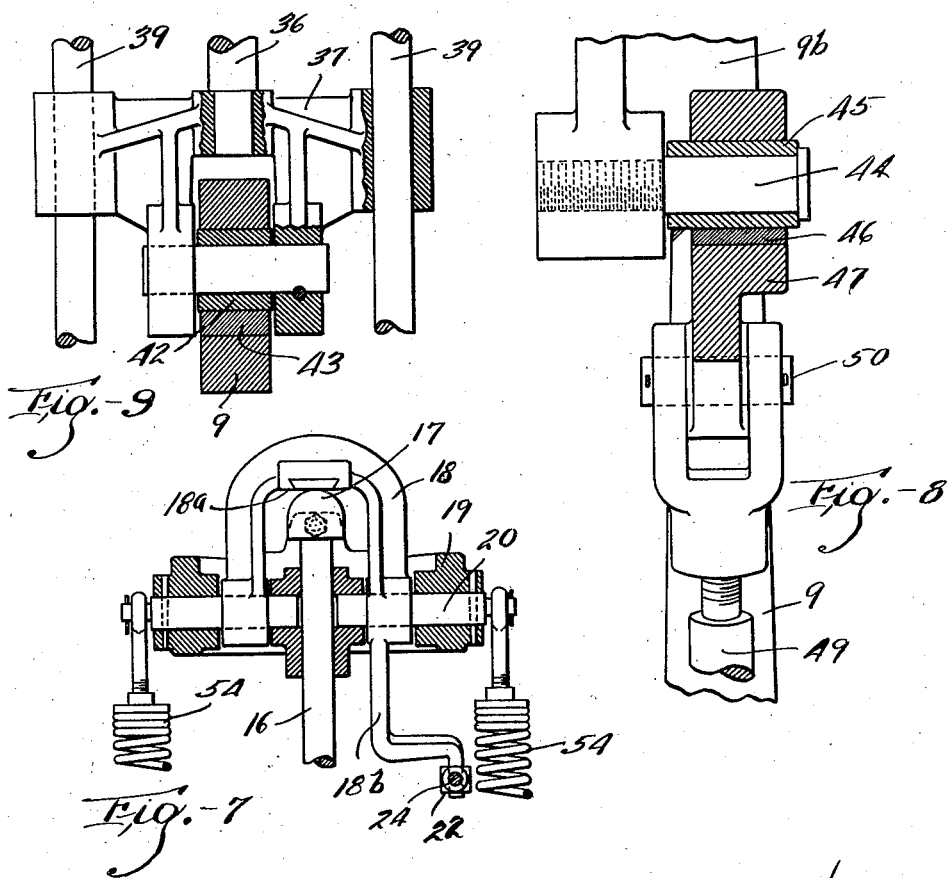
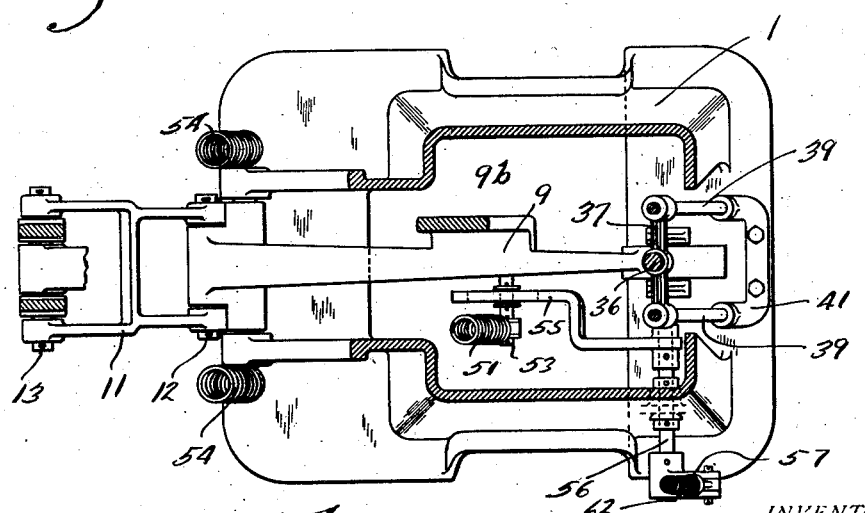
INVENTOR
Robert C. Pauly
BY Brockett & Hyde
ATTORNEYS

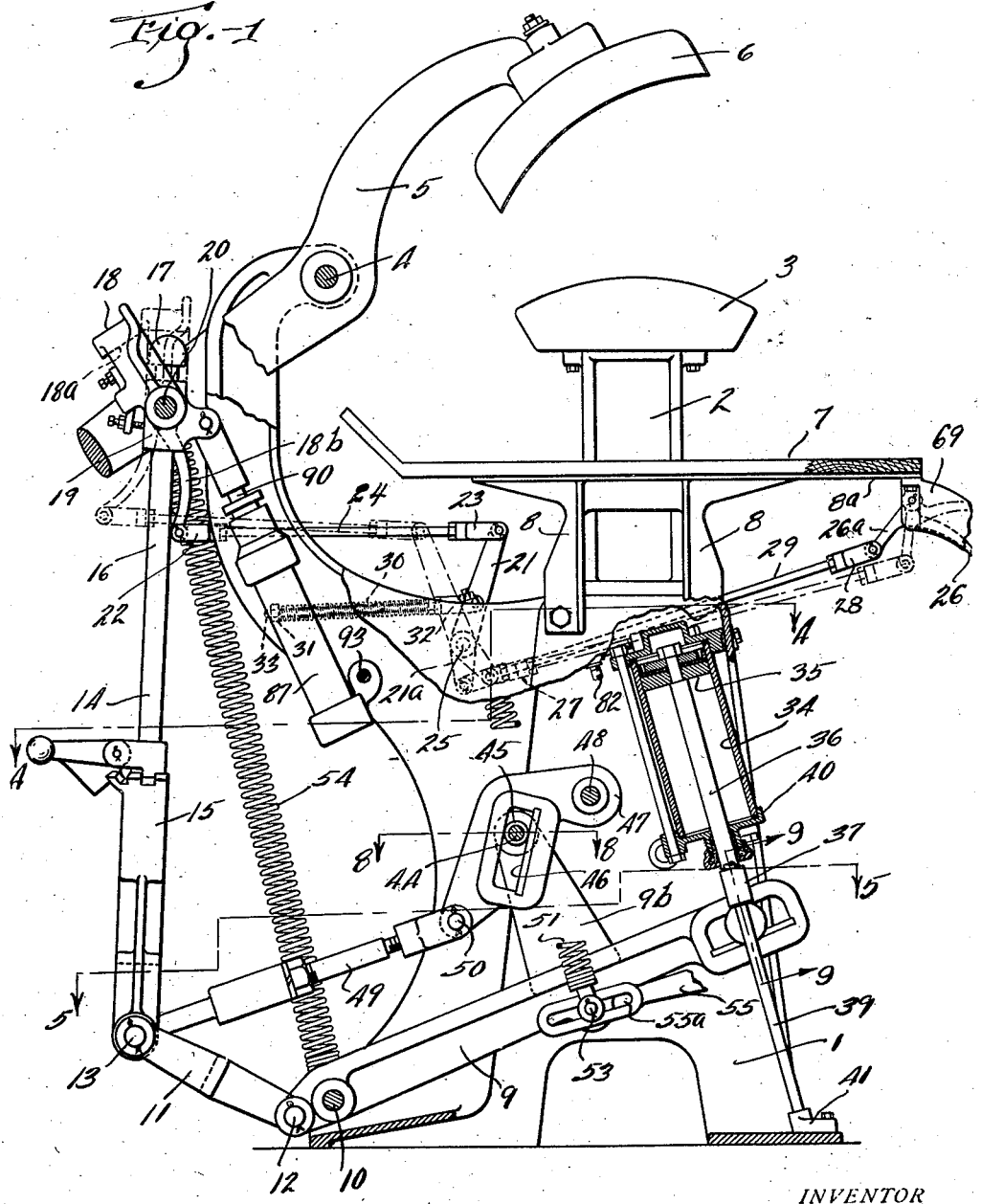

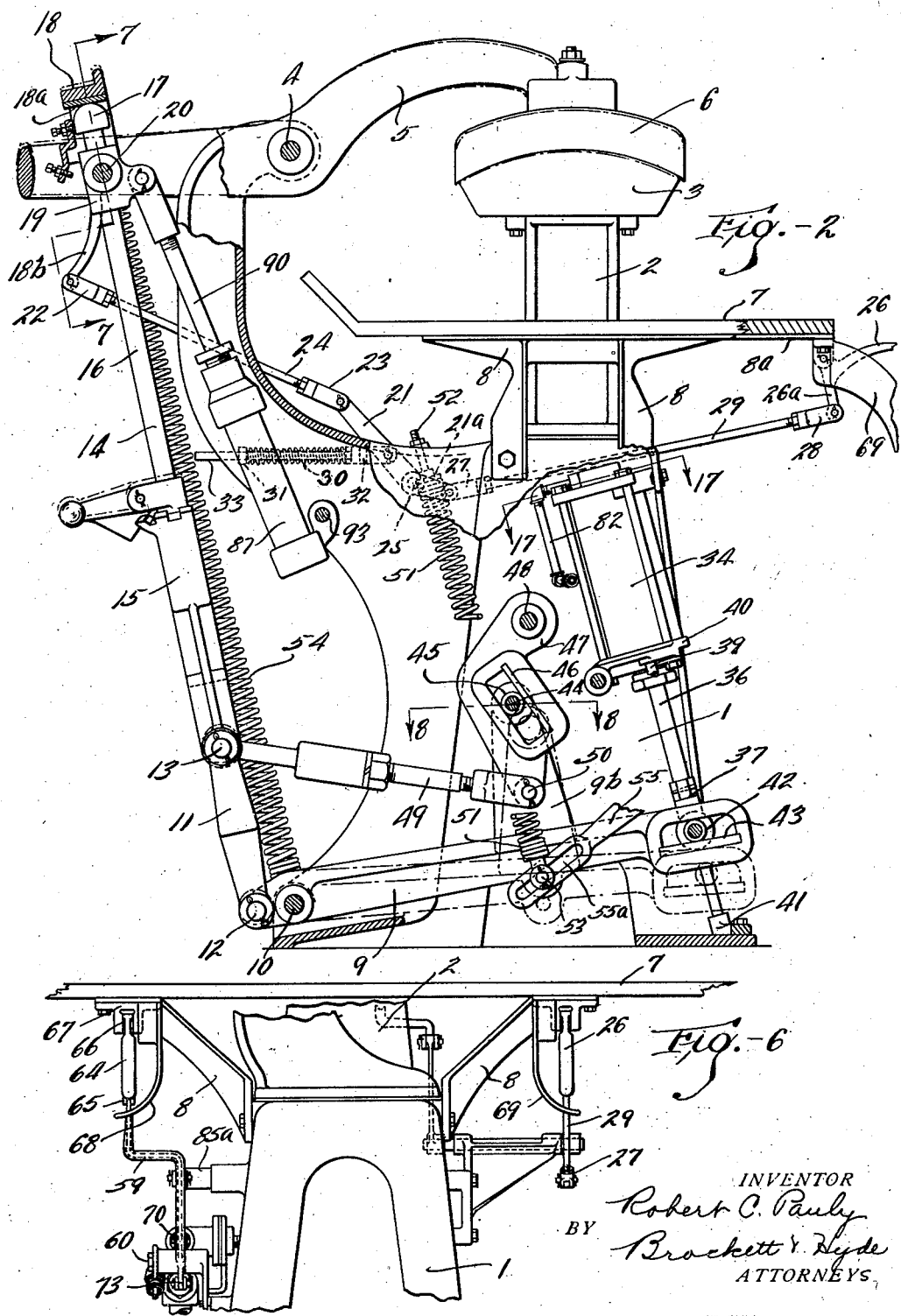

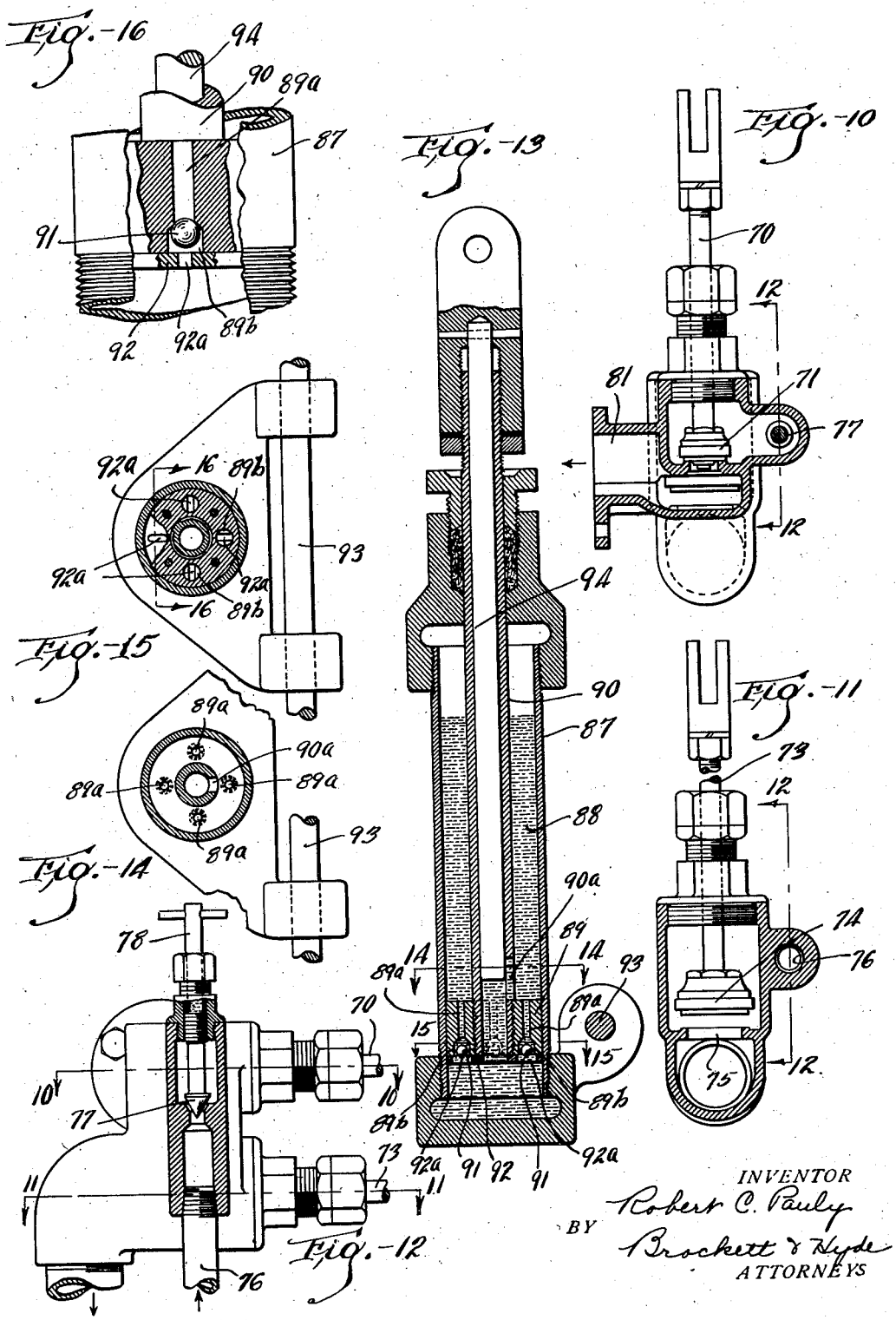

Patented Feb. 18, 1930

1,747,879

UNITED STATES PATENT OFFICE

ROBERT C. PAULY, OF CINCINNATI, OHIO, ASSIGNOR TO THE AMERICAN LAUNDRY MACHINERY COMPANY, OF CINCINNATI, OHIO, A CORPORATION OF OHIO

PRESSING MACHINE

Application filed November 11, 1926. Serial No. 147,747.

This invention relates to garment presses of the power closed and final pressure type.

More specifically, the invention relates to a power press wherein a single operating member arranged in the frame is connected to the head lever by a chain of mechanism taking two paths, so to speak, through one path of which the main toggles are straightened and the head is closed and through the other path final pressure is exerted without any appreciable further movement of the closing mechanism, the advantage of such a structure being that greater motion for producing final pressure is permitted without appreciable motion of the mechanism which closes the press. To be more exact, the machine is provided with an operating lever pivoted between its ends and providing a short power arm and a long actuating arm, the short power arm being connected to the head by a pair of main toggles and the longer arm being connected through an operating lever pivoted on the frame and through a link pivoted thereto to the knuckle of the main toggles together with a suitable lost motion pin and slot connection between the lever on the frame and the actuating arm of the operating lever, whereby, upon the first movement of the lever, the main toggles are brought to straightened position and thereafter power is applied by lifting the main toggles by the short arm of the operating lever without any further appreciable movement of the knuckle of the main toggles. The motion is extremely unique for performing the functions set forth.

Further invention resides in the provision of suitable controls, one in the form of a handle connected to a coupling device in the motion transmitting parts so that at the proper time the head is uncoupled from the power means, and another hand operated control suitably spaced from the first to prevent actuation by one hand and adapted for manipulating the control for the power means.

Still further invention resides in the other details of construction and arrangement brought out in the following description, drawings and claims.

The exact nature of the invention together with further objects and advantages thereof will be apparent from the following description taken in connection with the accompanying drawings in which Fig. 1 is a left hand elevation of a pressing machine exemplifying my invention, parts being broken away to show details of construction, and including dash dot lines to indicate an alternate position of the parts actuated by one of the control levers; Fig. 2 is a generally similar view showing the relation of the various parts with the pressing head in contact with the padded buck but before pressure has been applied; and in dash dot lines, parts after pressure has been applied; Fig. 3 is a similar partial elevation also with parts broken away to show particular details of the immediate cylinder control mechanism; Fig. 4 is a horizontal section along the plane of line 4—4, Figs. 1 and 3; Fig. 5 is a similar section along the plane of lines 5—5 of Figs. 1 and 3; Fig. 6 is a detailed front elevation of the machine showing the arrangement of the control levers thereof; Fig. 7 is a detailed section along the plane of line 7—7 Fig. 2, showing the mechanical interlock for the pressure applying mechanism; Fig. 8 is a detail section in the plane of line 8—8 of Figs. 1 and 2; Fig. 9 is a detail section in the plane of line 9—9 of Fig. 1, parts being broken away to show construction; Fig. 10 is a sectional detail of the inlet valve taken in the plane of line 10—10 Figs. 3 and 12; Fig. 11 is a sectional detail of the outlet valve taken in the plane of line 11—11 of Figs. 3 and 12; Fig. 12 is a sectional detail of the needle valve taken in the plane of line 12 of Figs. 4, 10 and 11; Fig. 13 is a sectional detail of the cushioning device; Fig. 14 is a horizontal section of the device taken in the plane of line 14, of Fig. 13; Fig. 15 is a similar section in the plane of line 15 of Fig. 13; Fig. 16 is a detail section of the same device taken in the plane of line 16—16 of Fig. 15; Fig. 17 is a section along the plane of line 17—17 Fig. 2.

Referring now to the drawings 1 is the base or frame of the machine upon which is secured the pedestal 2 carrying the padded buck 3. An upstanding portion at the rear of the base carries pivotally mounted at 4 a lever or pressure arm 5 to the forward end of which is secured the heated pressing head 6. To the rearwardly extending portion of the pressure arm 5 is secured a swivel block 19 by the pivotal mounting 20. The swivel block is provided with a vertical bore which serves to position the member 16 which together with the lower member 15 forms a push rod 14, adjustable to length by the mechanism indicated. The lower extremity of the push rod 14 is pivotally secured as at 13 with a link 11 extending to pivotal connection at 12 with a pressure lever 9 pivotally mounted at the foot of the base 1 at 10.

Secured upon the base at 48 is a closing lever 47 the free end of which is in connection with the joint 13 by means of a link 49, adjustable in length as indicated and joined with the lever 47 at 50. The lever 47 is provided with a slot one side of which is surfaced by the plate 46, to contact with a roller 45 mounted at 44 upon an upstanding member 9$^b$ of the lever 9.

The forward extremity of the lever 9 is provided with a similar slot and plate 43 co-operating with a roller 42 carried by a cross head 37 slidable upon a pair of parallel guide rods 39. The lower extremities of the guide rods are secured with the base in brackets 41, the upper extremities being secured in the lower head 40 of the cylinder 34 within which moves a piston 35, the rod of which 36 is secured with the cross head 37. The arrangement is obviously such that reciprocation of the piston 35 will effect corresponding movement of the lever 9 about its axis 10. The weight of the piston, piston rod and lever 9 is counterbalanced by the spring 51 extending in tension between a rod 52 secured with the frame of the machine and the pin 53 secured upon the lever.

The upper extremity of the member 16 carries a head 17. Pivotally mounted at 20 is a yoke shaped cap 18 provided with an inner surface 18$^a$ adapted to be moved as from the full line to the dash dot line position Fig. 1 into alignment with the push rod 14 whereby upward longitudinal movement of the push rod may be transmitted to the pressure arm 5 to close the head 6 upon the buck 3; but whereby when the cap 18 is in the full line position indicated movement of the push rod will be ineffective upon the head 6.

Assuming the cap 18 positioned to connect the push rod to actuate the head as described it will be noted that the parts 14 and 11 form a pair of toggle members the knuckle of which is at 13. It will also be evident that the toggle is controlled by the main operating lever 47 acting through the link 49 to straighten and break the main toggles. The closing lever 47 and the link 49 are toggle-like in construction in that when they move toward straightened position they break the main toggles and when they, themselves, are broken downward, as shown in Fig. 2, they straighten the main toggles and the slot therein moves to such a position that the pin 44, in its travel during the application of final pressure, produces very little, if any, movement of the main toggles. Indeed, all of these parts are so arranged that the first movement of the lever 9 rapidly straightens the main toggles and closes the press and thereafter, through the short lever arm at the rear forming a part of lever 9, exerts pressure with a lifting action of the main toggles without any considerable further movement of the main toggles.

The proportions and arrangement of the parts described are such that upon downward movement of the piston 35 from the position indicated in Fig. 1, to move the lever 9 downwards in a clockwise direction from the position indicated, the initial result will be an action of the roller 45 against the plate 46 to move the lever 47 in a counter clockwise direction with relatively high velocity. This motion of the lever 47 is transmitted through the link 49 to the knuckle 13 of the toggle straightening the members 14 and 11 into the aligned position indicated in Fig. 2, accomplished by relatively slight and immaterial motion of the axis pin 12. The result is that the head 6 is closed upon the buck 3 but without appreciable pressure between the pressing members.

The arrangement of the slot in the lever 47 will be seen to be such that continued downward movement of the piston 35 as from the full line position to the dotted position Fig. 2 will be without appreciable effect upon the lever 47, the members 14 and 11 remaining therefore positively secured in alignment or straightened position. During this motion of the piston however, the pin 12 upon the lever 9 is raised and the members 14 and 11 being straightened this motion of the pin 12 is transmitted through them to the pressure arm 5 resulting in the application of final pressure between the pressing members with the great leverage afforded by the proportions of the lever 9.

Upon return motion of the piston 35 and corresponding movement of the lever 9 the first action is to relieve pressure of the head 6 through the straightened toggle, this being effected without substantial alteration in the relationship of the toggle members, owing to the angularity of the slot in the lever 47 as before described. Continued upward movement of the piston swings the lever 47 with increasing velocity in a clockwise direction to break the toggle at the joint 13 and return the members to their original position as in Fig. 1; the pressure arm 5 and the pressing head 6 being balanced to open position by the springs 54.

What has thus far been described constitutes the primary actuating mechanism of the press and there remains to be described means for controlling the mechanism.

Obviously two things are necessary to effect closing of the head and the actual pressing operation. First, the cap 18 must assume the position to transmit motion of the push rod to the pressure arm, and be maintained in that position; and second, fluid pressure must be admitted to the cylinder 34 to effect through the lever 9 and mechanism described straightening of and pressure through the toggle members 11 and 14.

For control of the cap 18 I have provided a handle or lever 26 pivotally mounted on a bracket extension 8ª of the bracket 8, which bracket supports the usual work table 7. A member 26ª forms with the control handle 26 a bell crank connecting through the rod 29 and clevises 27, 28, with a lever 21ª mounted upon the rock shaft 25. A lever 21 is also secured on shaft 25 and is connected with a downwardly extending arm 18ᵇ of the cap 18 through the rod 24 and its clevises 22, 23.

Examination of the linkage described will show that the cap 18 may be swung from the full line position, Fig. 1, to operative position by an upward pull of the handle 26 to the position indicated in Fig. 2. A compression spring 30 is positioned upon a rod 33 extending between a clevis 32 in pivotal connection with lever 21 and an eye in the fixed stud 31 whereby the linkage is normally maintained to position the cap 18 clear of the head 17 upon the push rod.

It is particularly to be noted in this connection that in the wide open position of the press, movement of the control handle 26 to swing the cap 18 to abutting position with respect to the push rod is not sufficient to maintain this relative position of the cap throughout the closing stroke of the head. In fact the proportioning and angularity of the linkage connecting the cap and the handle with respect to the other parts of the press are such that in order to maintain the effectiveness of the push rod upon the pressure arm the handle 26 must be gradually raised from its lower or full line position in Fig. 1 as the head 6 is lowered upon the buck. In short, continual upward pressure must be exerted upon the handle 26 until the press goes into its actual pressing cycle, this arrangement making it necessary for the operator of the press to "follow through" the press motion with one hand.

Interconnected between a source of fluid pressure supply such as a compressed air receiver, and through the pipe 82 with the head end of the cylinder 34, and suitably mounted upon the frame 1, is a valve chest in which are mounted a pair of valves 71 and 74 controlling the inlet and outlet respectively of the cylinder. Valve stems 70 and 73 extend from these valves through suitable stuffing boxes and are provided with clevises connected with ears projecting from a lever 59, one above and one below the pivot stud 60 of the lever. The valve chest is provided with a needle valve 77 for controlling the passage of the motive fluid from the supply pipe 76 leading from a source of fluid pressure, such as a compressed air tank to the compartment above the inlet valve 71, the needle valve 77 being adjustable by a handled stem 78. The inlet valve 71 controls a passage from the valve 77 to the cylinder 34 through the passage 81. The outlet valve 74 controls a passage from the cylinder out through the exhaust pipe 75, the exhaust being carried away from the machine through suitable piping or opening directly into the atmosphere.

The upper end of the lever 59 is connected by means of a link 65 with a control handle 64 pivoted at 66 in a bracket 67 all in a manner similar to the control handle 26; and the arrangement is such that with the control handle in the position indicated in Fig. 3, the exhaust valve is open and the inlet valve closed, the piston consequently being at the top of its stroke due to the action of the spring 51; and when the handle 64 is raised to swing the lever 59 in a clockwise direction, the exhaust valve will close and the inlet valve open to force the piston downwards in the cylinder, the speed of the downward motion of the piston being controlled by the opening of the valve 77.

A rod 84 is mounted in brackets 85 and 85ª and connected with the lever 59 as indicated for reciprocal movement therewith. A spring 83 is in compression between the bracket 85ª and collar 86 fast upon the rod 84 whereby the lever 59 is normally yieldably urged to the position of Fig. 3, and hence maintaining the piston normally at the top of its stroke and the press members widely opened. Mounted for rocking movement upon the fixed stud 56 is a lever, one arm 55 of which terminates in an elongated eye 55ª fitting over the pin 53 on the lever 9, the other arm 57 being in connection with a rod 58 the upper end of which is loosely positioned in an eye in a lever arm 61 movable with the lever 59 about its axis 60. A spring 62 is positioned upon the rod 58 in compression between the lever 61 and a collar 63 fixed upon the rod. Obviously from the arrangement described, downward movement of the lever 9 will move the lever arms 55 and 57 in a counterclockwise direction and increase the tension of the spring 62 upon the lever 61 and hence upon the lever 59. The relative strength of the springs 62 and 83 and the relation of the parts is such that in the open position of the press the spring 83 is able to maintain the lever 59 to position the exhaust valve open and the intake valve closed, yet after the head of the press has been brought to contact with the buck sufficient tension is built up in the spring 62 to overcome the tendency of the spring 83 and hence yieldably maintain the valves in the reverse arrangement, that is the inlet valve open and the exhaust valve closed. The result is that once the operator has brought the head to closed position upon the buck the control lever 64 may be released and the spring 62 will maintain the pressure in the cylinder for as long a period as the operator may desire the pressing operation to extend. Exhaust of the cylinder and reopening of the pressing members may be thereafter effected by a downward motion of the control handle 64.

A pair of guards 68, 69 are fixed upon the brackets 8ᵃ and extend forwardly alongside the control handles 26 and 64 as shown in Fig. 6 for the purpose of preventing manipulation of the handles other than in the manner intended.

For the purpose of making the machine as noiseless and smooth acting as possible when the head is being opened, I have provided a cushioning device which tends to retard opening movement of the head, bringing the same to rest without a sudden jar. This cushioning device comprises a cylinder 87 pivotally mounted at 93 upon the base, and movably positioned therein a piston head 89 with a hollow piston rod 90 in connection with the swivel block 19 as indicated. The cylinder is filled or partially filled with oil 88 and the piston rod 90 is provided with a lateral opening 90ᵃ as shown particularly in Fig. 13. The piston head 89 is provided with a number of longitudinal passages 89ᵃ each widened at its lower end as at 89ᵇ to form a valve seat. The bottom of the piston is capped with a collar 92 provided with radially extending slots 92ᵃ aligned each with an opening 89ᵇ, the collar 92 forming with the openings 89ᵇ a number of valve chambers in each of which is positioned a ball valve 91. The arrangement is obviously that of a number of individual check valves in the piston each allowing downward flow of oil through the piston, but checking the upward flow. The operation of the cushioning device is equally obvious. During closing movement of the press members the piston 89 is forced upwardly in the cylinder 87, the oil flowing freely through the passage 89ᵃ so that practically no resistance results. On the opening movement of the press however downward movement of the piston in the cylinder 87 causes seating of the valves 91 restricting passage of oil upwards with respect to the piston through the opening 90ᵃ and thus impeding the motion of the head. This cushioning effect may be regulated by adjusting the rod 94 in the hollow piston rod downwardly or upwardly to increase or decrease the effective area of the passage 90ᵃ, the means of accomplishing this adjustment being the screw threaded connection between the outer end of the piston rod and the clevis by which it is connected with the cap 18.

From the above description the manner of operating the press will be seen to be as follows, assuming the press in wide open position as indicated in Fig. 1.

After smoothing the work to be pressed upon the buck 3, to close the press it is necessary for the operator to move upwardly both the control handles 26 and 64, this necessitating removal of both hands from the danger zone between the pressing members. Movement of the handle 26 positions the cap 18 to render the mechanism effective to close the head, and movement of the handle 64 effects actuation of the mechanism to close the head, all as described. Closing of the head takes place rapidly owing to the leverage of the toggle arrangement provided; but this leverage operates with changing ratio so that the head moves with rapidly diminishing velocity and contacts with the work gently. If the operator during any portion of the closing movement releases the handle 26 or fails to "follow through" with upward pressure on the handle the spring 30 will move the cap 18 from its abutting position with respect to the push rod and thus release the head from the closing mechanism. If the handle 64 is released during any portion of the closing movement pressure in the cylinder 34 is cut off and the mechanism returns to the wide open press position through the action of the springs 83 and 54. Once the press is closed, however, the increased leverage of the mechanism upon the pressure arm 5 is sufficient to maintain the cap 18 abutting the push rod so that the handle 26 may be released; likewise, in closed position of the pressing members the spring 62 is effective to maintain the handle 64 in fluid pressure applied position, the result being that the press will remain closed with maximum pressure.

To open the press a downward motion of the handle 64 is sufficient, this motion being against the spring 62 to relieve the pressure in the cylinder 34 and allow the springs 54 to return the head to wide open position. As pressure of the head upon the buck is relieved the cap 18 snaps back under the action of spring 30 to clear the push rod and reset the handle 26 in its lower position, and as the head returns to open position the spring 83 becomes again effective to maintain the handle 64 in lowered position. The opening movement of the head is rapidly accomplished but gently terminated by the cushioning device described.

What I claim is:

1. In a press of the type described, a frame, a bed, a head lever mounted in the frame, a head carried by the forward end of said lever, a pair of main toggle members connected at their upper end to the head lever, a main operating lever mounted in the frame and having an actuating arm and another arm connected to the lower end of said main toggle members, power means operatively connected to said operating lever, and a press closing mechanism operatively connected to the frame and effectively connected to the knuckle of the main toggle members and comprising a closing lever connected to the frame, a link connected thereto at one end and at its other effectively connected to the knuckle of the main toggle members, and connections between said closing lever and said main operating lever.

2. A press as in claim 1 wherein the connections between the main operating lever and the closing lever is in the form of a pin and slot connection.

3. A press as in claim 1 wherein the connection between the main operating lever and the closing lever includes a slot in said closing lever and a pin engaging therein and operated by said main operating lever.

4. A press as in claim 1 wherein the connection between the main operating lever and the closing lever includes a slot in said closing lever and a pin engaging therein and operated by said main operating lever, said slot extending at an angle to a line connecting the pivots of said closing lever whereby a camming action is produced upon said closing lever by said pin and slot connections.

5. A press as in claim 1 wherein the motor means is provided with a controller, means normally tending to move said controller to the "off" position, and means actuated by the head closing and power applying means for overcoming the normal tendency of said controller and holding it in the "on" position to maintain power upon the press until released.

6. In a press of the type described, a frame, a bed, a head lever mounted in the frame, a head carried by the forward end of said lever, a pair of main toggle members connected at their upper end to the rear end of said head lever and extending downward at the rear, a main operating lever pivoted near the rear of the frame and having a relatively short arm connected to the lower end of the main toggle members and the forwardly upwardly inclined actuating arm, a press closing lever pivoted in the frame above said actuating arm and toward the front of the frame, a link connected to the free end of said closing lever and effectively connected to the knuckle of the main toggle members, said main toggle members straightening as said closing lever and its link break and vice versa, and connections between said closing lever and said actuating arm.

7. A press as in claim 6 wherein the connections between the closing mechanism and the actuating arm comprises a diagonally disposed slot in the closing lever, a bracket extending upward from the operating lever actuating arm, and a pin carried by said bracket and engaging in said slot.

8. In a press of the type described, a frame, a bed, a head lever, a head carried by said lever, power means, operative connections between said power means and said head lever for closing the press from full open position and exerting final pressure upon the pressing members, a coupling and uncoupling device in said connections for permitting or preventing transmission of motion from the motor means to the head, a controller for the motor means, and a pair of separated hand actuated controllers one connected to the coupling device and another connected to the controller for the motor means.

In testimony whereof I hereby affix my signature.

ROBERT C. PAULY.